United States Patent [19]

Tsubota

[11] Patent Number: 5,193,160
[45] Date of Patent: Mar. 9, 1993

[54] ADDRESS TRANSLATION SYSTEM WITH REGISTER STORING SECTION AND AREA NUMBERS

[75] Inventor: Masashi Tsubota, Tokyo, Japan
[73] Assignee: NEC Corporation, Tokyo, Japan
[21] Appl. No.: 474,261
[22] Filed: Feb. 5, 1990
[30] Foreign Application Priority Data Feb. 3, 1989 [JP] Japan .................................. 1-24859

[51] Int. Cl.$^5$ ....................... G06F 12/08; G06F 12/10
[52] U.S. Cl. .................................. 395/400; 395/425; 364/256.3; 364/256.4; 364/DIG. 1
[58] Field of Search ............................. 395/400, 425

[56] References Cited

U.S. PATENT DOCUMENTS

| | | | |
|---|---|---|---|
| 4,170,039 | 10/1979 | Beacom et al. | 395/400 |
| 4,792,897 | 12/1988 | Gotou et al. | 395/400 |
| 4,922,415 | 5/1990 | Hemdal | 395/400 |
| 4,961,135 | 10/1990 | Uchihori | 395/400 |
| 5,077,654 | 12/1991 | Ohtsuki | 395/400 X |
| 5,077,826 | 12/1991 | Grohoski et al. | 395/400 |
| 5,099,415 | 3/1992 | Osler et al. | 395/400 |

FOREIGN PATENT DOCUMENTS 0059236 9/1982 European Pat. Off. .

*Primary Examiner*—Joseph L. Dixon
*Assistant Examiner*—Michael A. Whitfield
*Attorney, Agent, or Firm*—Foley & Lardner

[57] ABSTRACT

An address translation system for converting into a real address a virtual address including a virtual section number, a virtual area number and a virtual page number, comprises a plurality of stages of tables including at least area tables and page tables, a translation look-aside buffer having a plurality of entries each storing a virtual section number, a virtual area number and a virtual page number, an area preservation register for preserving a virtual section number and a virtual area number of a given virtual address when a new entry is registered into the translation look-aside buffer, a table register for preserving an output of an area table selected when the new entry is registered into the translation look-aside buffer, and an area comparator for comparing a content of the area preservation register with a virtual section number and a virtual area number of a given virtual address. When the translation look-aside buffer is retrieved on the basis of the given virtual address, if an entry having the same virtual section number, virtual area number and virtual page number as those of the given virtual address is not found, the area comparator is used for comparing the content of the area preservation register with the virtual section number and the virtual area number of the given virtual address. If coincidence is detected by the comparator, an address translation is performed by accessing a page table on the basis of the page table information preserved in the page table register, without accessing the area table.

3 Claims, 3 Drawing Sheets

ADDRESS TRANSLATION SYSTEM WITH REGISTER STORING SECTION AND AREA NUMBERS

BACKGROUND OF THE INVENTION

1. Field of the Invention

The present invention relates to a data processing system, and more specifically to an address translation system for a microprocessor.

2. Description of Related Art

Conventional systems for translating an virtual address into a real address have been based on a construction method in which an address space is divided into a plurality of section spaces, each of which is divided into a plurality of area spaces, each of which is divided into a plurality of page spaces. In this case, a virtual address includes a virtual section number, a virtual area number, a virtual page number and a displacement or an offset within a page.

For example, an address translation system for translating the above mentioned virtual address into a real address comprises a group of area table registers one of which is selected on the basis of a virtual section number included in a given virtual address, area tables one of which is designated by the selected area table register and receives a virtual area number included in the given virtual address for designating an area space, and page tables one of which is designated by an output of the designated area table and receives a virtual page number included in the given virtual address for designating a page space.

In the above mentioned address translation system, accordingly, one area table register is selected from the group of area table registers in accordance with a virtual section number included a given virtual address. Then, an entry of an area table is designated by using a value stored in the selected area table register as a base address for an area table to be selected, and by using as an index a virtual area number included in the given virtual address. Furthermore, an entry of a page table is designated by using information outputted from the selected area table as a base address of a page table to be selected, and by using as an index a virtual page number included in the given virtual address. Thus, information outputted from the selected page table is a base address of a page frame within a main memory, and therefore, is combined with a displacement included in the given virtual address so as to obtain a real address.

Accordingly, the above mentioned address translation system comprises one set of registers and two kinds of address translation tables, and therefore, requires a substantial time for address translation. If all address translations are performed in this method, performance greatly falls down.

In view of this disadvantage, the conventional address translation system has been associated with an address translation retrieval buffer or translation look-aside buffer (TLB) so as to shorten the time required for the address translation. This translation look-aside buffer is composed of an associative memory, and stores a plurality of entry-address sets, an entry of each set being composed of one combination of a virtual section number, a virtual area number and a virtual page number, and an address of each set being composed of, for example, a page frame address within a main memory corresponding to the combination of the virtual section number, the virtual area number and the virtual page number defined in the associated entry.

In the case that the translation look-aside buffer is provided, when an virtual address is given, the translation look-aside buffer is retrieved in order to find an entry which is the same as the given virtual address all in the virtual section number, in the virtual area number and in the virtual page number. If an entry completely coincident with these virtual numbers is found, a corresponding real page number can be immediately obtained, and therefore, the obtained real page number is combined with a displacement included in the given virtual address, so that a real address is easily obtained. However, if an entry coincident with the virtual numbers is not found, namely, if the translation look-aside buffer does not hit, two stages of table retrieval must be retrieved.

SUMMARY OF THE INVENTION

Accordingly, it is an object of the present invention to provide an address translation system which has overcome the above mentioned defect of the conventional one.

Another object of the present invention is to provide an address translation system capable of quickly obtaining a real address even if an associated translation look-aside buffer does not hit.

The inventor of the present invention has noted that when an entry having the same virtual section number, virtual area number and virtual page number as those of a given virtual address is not found in a translation look-aside buffer, there is a high degree of possibility that the virtual section number and the virtual area number of the given virtual address are the same as a virtual section number and a virtual area number of an entry (a combination of a virtual section number, a virtual area number and a virtual page number) which had been most recently registered or exchanged to the translation look-aside buffer. The present invention has been made on the basis of this recognition.

The above and other objects of the present invention are achieved in accordance with the present invention by an address translation system characterized by comprising an area preservation register for preserving a virtual section number and a virtual area number when a new entry is registered into a translation look-aside buffer, a page table register for preserving an area table output when the new entry is registered into the translation look-aside buffer, and an area comparator for comparing an content of the area preservation register with a virtual section number and a virtual area number of a given virtual address.

With the above mentioned arrangement, when the translation look-aside buffer is accessed on the basis of the given virtual address, if an entry having the same virtual section number, virtual area number and virtual page number as those of the given virtual address is not found, the area comparator is used for comparing the virtual section number and the virtual area number of the given virtual address with the content of the area preservation register preserving a virtual section number and a virtual area number of an entry most recently registered into the translation look-aside buffer. If coincidence is detected by the comparator, an address translation is performed by accessing a page table on the basis of the page table information preserved in the page table register, without accessing the area table on a main memory.

The above and other objects, features and advantages of the present invention will be apparent from the following description of preferred embodiments of the invention with reference to the accompanying drawings.

DESCRIPTION OF THE PREFERRED EMBODIMENTS

Figure 1:
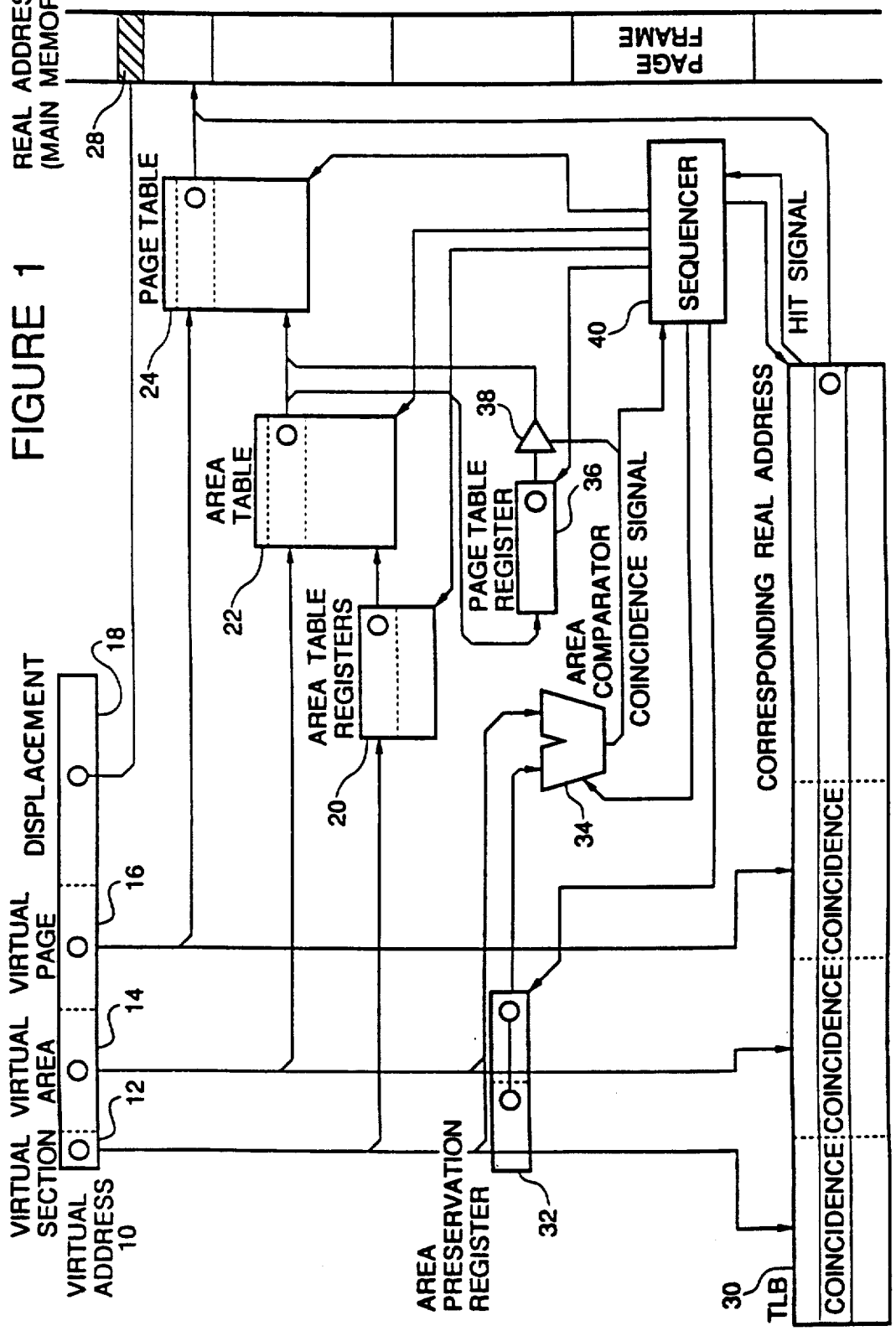
FIG. 1 is a block diagram of a first embodiment of the address translation system in accordance with the present invention.

Referring to FIG. 1, there is shown a block diagram of a first embodiment of the address translation system in accordance with the present invention. A virtual address 10 given to the address translation system includes a virtual section number 12, a virtual area number 14, a virtual page number 16 and a displacement 18. The virtual section number 12 is supplied to a group of area table registers 20, so that one area table register designated by the virtual section number 12 is selected from the group of area table registers 20. Each of the area table registers 20 holds a base address for a corresponding area table, and the group of area table registers 20 is ordinarily located in a microprocessor.

A plurality of area tables 22 corresponding to the area table registers 20 are provided in a main memory. For simplification of drawing, only one area table is shown in FIG. 1. A base address of an area table to be designated is given by an output of the selected area table register 20. Each area table 22 holds area table information which is retrieved by receiving the virtual area number 14 as an offset.

A number of page tables 24 are also provided in the main memory, but only one page table is shown for simplification of drawing. A base address of a page table to be designated is given by the page table information outputted from the designated area table 22. Each page table 24 holds page table information which is retrieved by receiving the virtual page number 16 as an offset.

Thus, a real address 28 within the main memory can be obtained as a value obtained by using, as a base address for a page frame within the main memory, the page table information output from the page table 24 (or a high place real address corresponding to a given virtual address and output from a translation look-aside buffer 30 explained below) and by using the displacement 18 of the virtual address as an offset.

The translation look-aside buffer 30 is provided within the microprocessor to receive the virtual section number 12, the virtual area number 14 and the virtual page number 16 of the given virtual address 10, and stores a plurality of entry-address sets. An entry of each entry-address set is composed of one combination of a virtual section number 12, a virtual area number 14 and a virtual page number 16, and on the other hand, an address of each entry-address set is composed of a page frame address within the main memory corresponding to the combination of the virtual section number 12, the virtual area number 14 and the virtual page number 16 defined in the associated entry. The translation look-aside buffer 30 outputs the page frame address, namely, a high place real address corresponding to the given virtual address if exists.

Furthermore, there is provided an area preservation register 32 coupled to receive the virtual section number 12 and the virtual area number 14 of the given virtual address 10, and to register the received virtual section number 12 and virtual area number 14 when anticoincidence is detected by an area comparator 34 explained below and an new entry-address set is registered into the translation look-aside buffer 30.

The area comparator 34 has one input connected to receive a content of the area preservation register 32 and the other input connected to receive the virtual section number 12 and the virtual area number 14 of the given virtual address 10, so that the content of the area preservation register 32 is compared with the virtual section number 12 and the virtual area number 14 of the given virtual address 10.

A page table register 36 is coupled to receive an output of the area table 22 and to store an entry of the area table 22 when anticoincidence is detected by the area comparator 34 and the new entry-address set is registered into the translation look-aside buffer 30. An output of the page table register 36 is supplied to the page table 24 through an gate circuit 38 which is controlled by an output of the area comparator 34.

In addition, a sequencer 40 is provided to receive a hit signal from the translation look-aside buffer 30 and the output signal from the area comparator 34. When the hit signal from the translation look-aside buffer 30 indicates that the virtual section number 12, the virtual area number 14 and the virtual page number 16 of a given virtual address is coincident with one of entries stored in the translation look-aside buffer 30, the sequencer 40 maintains the area table registers 20, the area tables 22, the page tables 24 and the area comparator 34 in an inactive condition. On the other hand, when the hit signal from the translation look-aside buffer 30 indicates anticoincidence, the sequencer 40 brings the area comparator 34 into an active condition. In this case, if the comparator 34 outputs a coincidence signal which causes the gate 38 to open, the sequencer 40 brings the page table 24 into an active condition while maintaining the area table registers 20 and the area tables 22 in the inactive condition. Thereafter, the sequencer 40 controls to the effect that the virtual section number 12, the virtual area number 14 and the virtual page number 16 of the given virtual address and a corresponding real address are registered into the translation look-aside buffer 30. If the comparator 34 outputs an anticoincidence signal, the sequencer 40 sequentially brings the area table registers 20, the area tables 22 and the page tables 24 into an active condition in the named order. Thereafter, the sequencer 40 controls the area preservation register 32 to store the virtual section number 12 and the virtual area number 14 of the given virtual address, and also controls the page table register 36 to store the output of the area table 22. In addition, the sequencer 40 controls to the effect that the virtual section number 12, the virtual area number 14 and the virtual page number 16 of the given virtual address and a corresponding real address are registered into the translation look-aside buffer 30.

Figure 2:
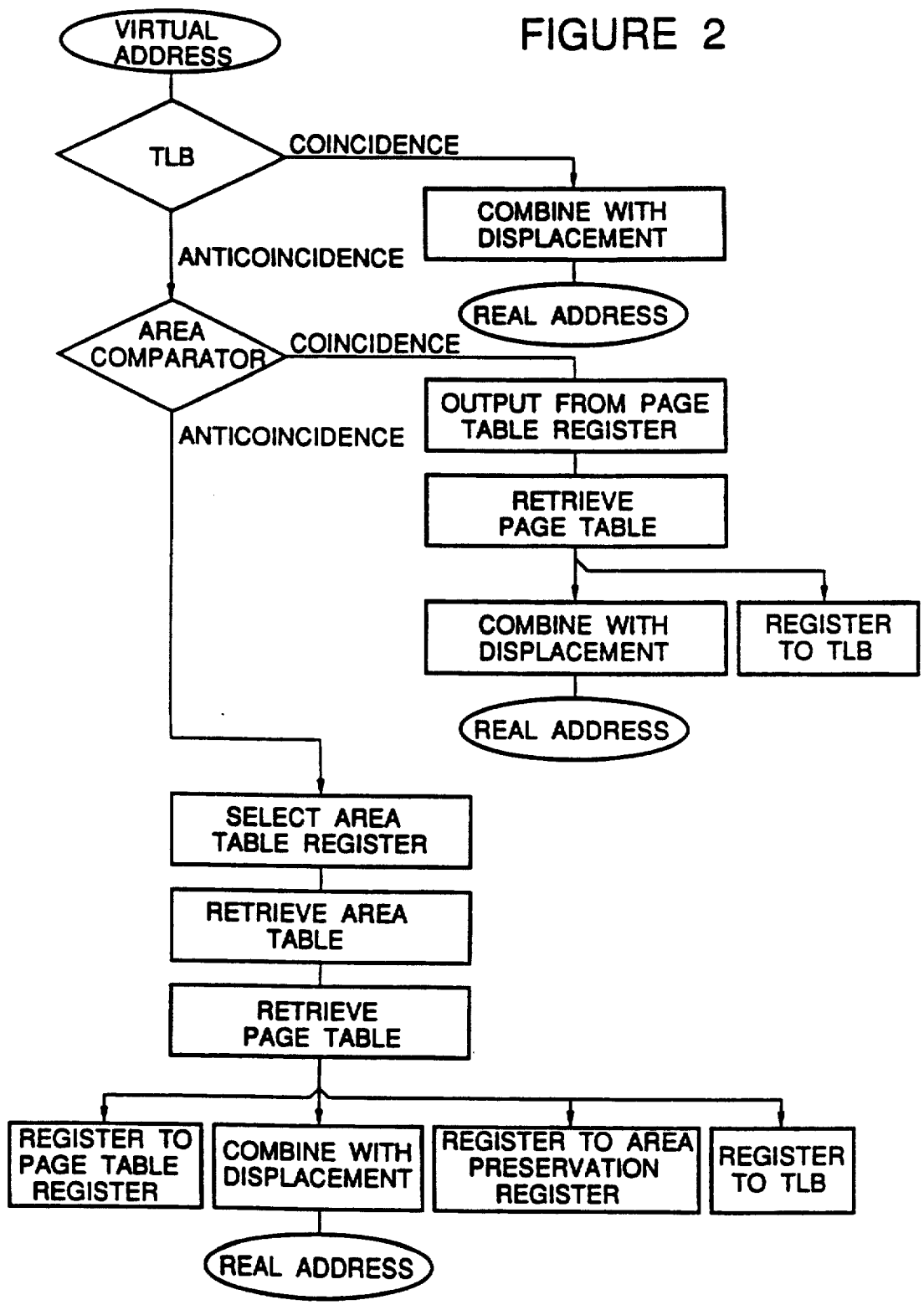
FIG. 2 is a flow chart illustrating an operation of the address translation system shown in FIG. 1.

Now, an operation of the above mentioned address translation system will be described with reference to FIG. 2 which shows a flow chart illustrating the address translation operation controlled by the sequencer 40.

When a virtual address is given, it is in some cases that the virtual address hits on the translation look-aside buffer 30. Namely, when the virtual section number 12, the virtual area number 14 and the virtual page number 16 of the given virtual address 10 are compared with all the entries of the translation look-aside buffer 30, if the virtual section number 12, the virtual area number 14 and the virtual page number 16 of the given virtual address 10 are completely coincident with one entry of the translation look-aside buffer 30, a real address associated to the coincident entry is extracted from the translation look-aside buffer 30 and combined with the displacement 18 of the virtual address 10 so that a complete real address is obtained.

If an entry completely coincident with the virtual section number 12, the virtual area number 14 and the virtual page number 16 of the given virtual address 10 does not exist in the translation look-aside buffer 30, the area comparator 34 compares the vitual section number 12 and the virtual area number 14 of the given virtual address 10 with a content of the area preservation register 32 which stores the virtual section number 12 and the virtual area number 14 most recently registered to the translation look-aside buffer 30. If the comparator 34 outputs a coincidence signal, the page table 24 is retrieved on the basis of the virtual page number 16 by using as a base address the page table information preserved in the page table register 38, without accessing the area table 20 in the memory, and a page frame address obtained by the retrieval of the page table 24 is combined with the displacement 18 of the given virtual address, so that a complete real address is obtained. In addition, the virtual section number 12, the virtual area number 14 and the virtual page number 16 of the given virtual address 10 and the high place portion of the obtained real address (page frame address) are newly registered in the translation look-aside buffer 30.

If an entry completely coincident with the virtual section number 12, the virtual area number 14 and the virtual page number 16 of the given virtual address 10 does not exist in the translation look-aside buffer 30, and the comparator 34 outputs an anticoincidence signal, the two-stage table retrieval is performed, similarly to the conventional system. First, one area table register 20 is selected in accordance with the virtual section number 12 of the given virtual address 10, and then, one area table 22 is selected on the output of the selected area table register 20 and retrieved in accordance with the virtual area number 14 of the given virtual address 10. Thereafter, one page table 24 is selected on the output of the selected area table 22 and retrieved in accordance with the virtual page number 16 of the given virtual address 10. Finally, an output of the page table 24 is combined with the displacement of the given virtual address 10 so as to generate a complete real address. In addition, the virtual section number 12 and the virtual area number 14 of the given virtual address 10 are registered or preserved in the area preservation register 32, and the retrieved entry of the area table 22 is registered or preserved in the page table register 36. Furthermore, a new entry composed of the virtual section number 12, the virtual area number 14 and the virtual page number 16 of the given virtual address 10 and a new real address corresponding to the new entry are newly registered in the translation look-aside buffer 30.

The above mentioned address translation operation is controlled by the sequencer 40, as mentioned above. However, the address translation operation can be controlled by the microprocessor in accordance with a program.

Figure 3:
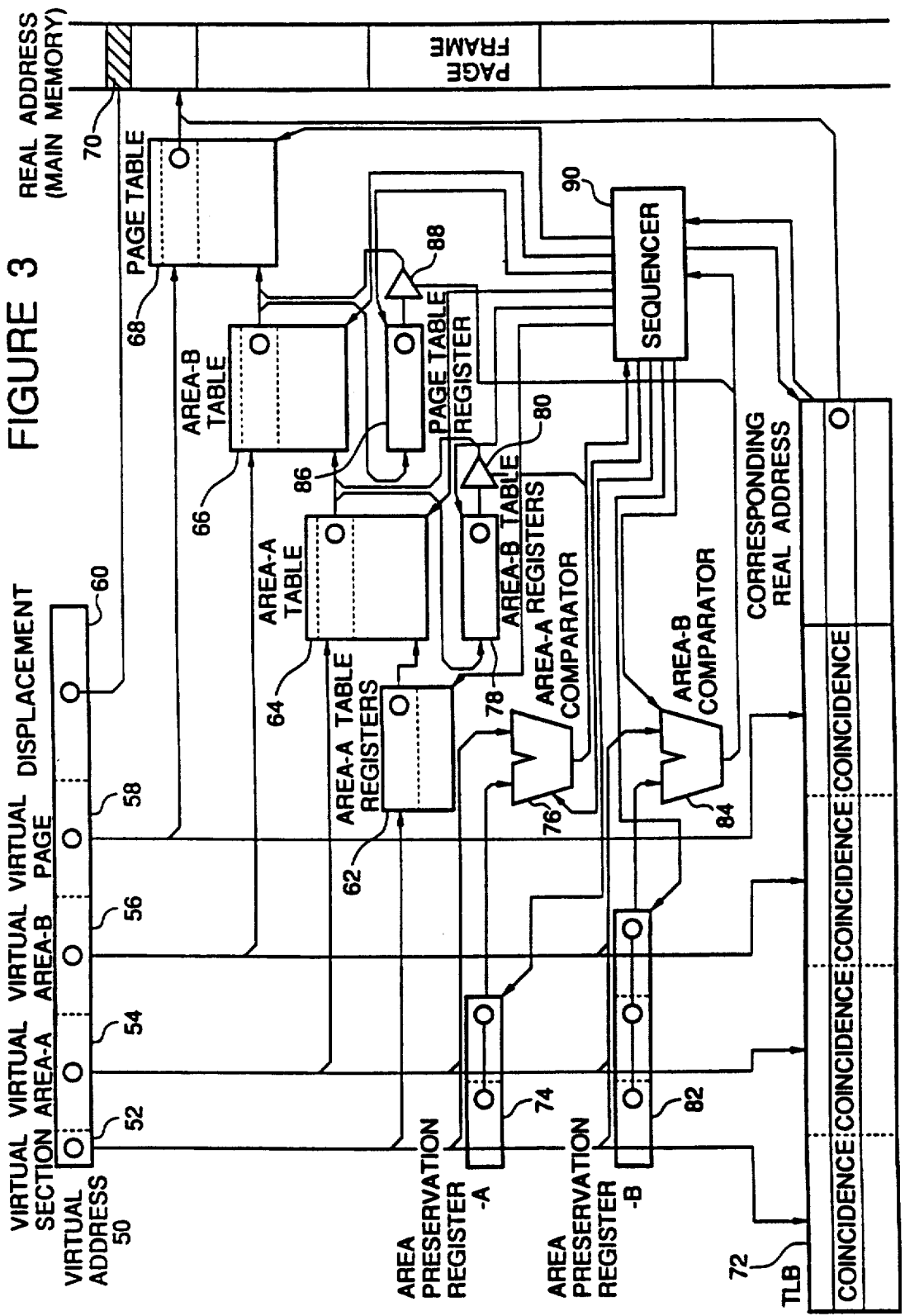
FIG. 3 is a block diagram of a second embodiment of the address translation system in accordance with the present invention.

Turning to FIG.3, there is shown a block diagram of a second embodiment of the address translation system in accordance with the present invention. In this second embodiment, a virtual address 50 given to the address translation system includes a virtual section number 52, a virtual area-A number 54, a virtual area-B number 56, a virtual page number 58 and a displacement 60. The virtual section number 52 is supplied to a group of area-A table registers 62, so that one area-A table register designated by the virtual section number 52 is selected from the group of area-A table registers 62. Each of the area table registers 20 holds a base address for a corresponding area-A table.

A plurality of area-A tables 64 corresponding to the area-A table registers 20 are provided, but, for simplification of drawing, only one area-A table is shown in FIG. 3. A base address of an area-A table to be designated is given by an output of the selected area-A table register 62. Each area-A table 22 holds area-A table information which is retrieved by receiving the virtual area-A number 54 as an offset.

A number of area-B tables 66 are also provided, but only one area-B table is shown for simplification of drawing. A base address of an area-B table to be designated is given by the area-A table information output from the designated area-A table 64. Each area-B table 66 holds area-B table information which is retrieved by receiving the virtual area-B number 56 as an offset.

A number of page tables 68 are provided, but only one page table is shown for simplification of drawing. A base address of a page table to be designated is given by the area-B table information output from the designated area-B table 66. Each page table 68 holds page table information which is retrieved by receiving the virtual page number 58 as an offset.

Thus, a real address 70 within the main memory is indicated by a value obtained by using, as a base address for a page frame within the main value memory, the page table information output from the page table 68 (or a high place real address corresponding to a given virtual address and output from a tranlation look-aside buffer 72 explained below) and by using the displacement 60 of the virtual address as an offset.

The translation look-aside buffer 72 is coupled to receive the virtual section number 52, the virtual area-A number 52, the virtual area-B number 54 and the virtual page number 58 of the given virtual address 50, and stores a plurality of entry-address sets. An entry of each entry-address set is composed of one combination of a virtual section number 52, a virtual area-A number 52, a virtual area-B number 54 and a virtual page number 58, and on the other hand, an address of each entry-address set is composed of a page frame address within the main memory corresponding to the combination of the virtual section number 52, the virtual area-A number 52, the virtual area-B number 54 and the virtual page number 58 defined in the associated entry. The translation look-aside buffer 72 outputs the page frame address, namely, a high place real address corresponding to the given virtual address if it exists.

Furthermore, an area preservation register-A 74 is coupled to receive the virtual section number 52 and the virtual area-A number 54 of the given virtual address 50, and to register the received virtual section number 52 and the virtual area-A number 54 when anticoincidence is detected by an area-A comparator 76 explained below and an new entry-address set is registered into the translation look-aside buffer 72.

The area-A comparator 76 has one input connected to receive a content of the area preservation register-A 74 and the other input connected to receive the virtual section number 52 and the virtual area-A number 54 of the given virtual address 50, so that the content of the area preservation register-A 74 is compared with the virtual section number 52 and the virtual area-A number 54 of the given virtual address 50.

An area-B table register 78 is coupled to receive an output of the area-A table 64 and to store an entry of the area-A table 64 when anticoincidence is detected by the area-A comparator 76 and the new entry-address set is registered into the translation look-aside buffer 72. An output of the area-B table register 78 is supplied to the area-B table 66 through an gate circuit 80 which is controlled by an output of the area-A comparator 76.

In addition, an area preservation register-B 82 is coupled to receive the virtual section number 52, the virtual area-A number 54 and the virtual area-B number 56 of the given virtual address 50, and to register the received virtual section number 52, the virtual area-A number 54 and the virtual area-B number 56 when anticoincidence is detected by an area-B comparator 84 explained below and an new entry-address set is registered into the translation look-aside buffer 72.

The area-B comparator 84 has one input connected to receive a content of the area preservation register-B 82 and the other input connected to receive the virtual section number 52, the virtual area-A number 54 and the virtual area-B number 56 of the given virtual address 50, so that the content of the area preservation register-B 82 is compared with the virtual section number 52, the virtual area-A number 54 and the virtual area-B number 56 of the given virtual address 50.

A page table register 86 is coupled to receive an output of the area-B 66 and to store an entry of the area-B table 66 when anticoincidence is detected by the area-B comparator 84 and the new entry-address set is registered into the translation look-aside buffer 72. An output of the page table register 86 is supplied to the page table 68 through an gate circuit 88 which is controlled by an output of the area-B comparator 84.

Furthermore, there is provided a sequencer 90 similar to the sequencer 40 provided in the first embodiment.

Now, an operation of the above mentioned second embodiment of the address translation system will be described. The following address translation operation is controlled by the sequencer 90.

When a virtual address is given, it is in some cases that the virtual address hits on the translation look-aside buffer 72, similarly to the first embodiment. Namely, the virtual section number 52, the virtual area-A number 54, the virtual area-B number 56 and the virtual page number 58 of the given virtual address 50 are compared with all the entries of the translation look-aside buffer 72. If coincidence is obtained, a real address corresponding to a coincident entry is extracted from the translation look-aside buffer 72 and combined with the displacement 60 of the given virtual address 50 so that a complete real address is obtained.

If an entry is completely coincident the virtual section number 52, the virtual area-A number 54, the virtual area-B number 56 and the virtual page number 58 of the given virtual address 50 does not exist in the translation look-aside buffer 72, the area-B comparator 84 compares the virtual section number 52, the virtual area-A number 54 and the virtual area-B number 56 of the given virtual address 50 with a content of the area preservation register-B 82 which stores the virtual section number 52, the virtual area-A number 54 and the virtual area-B number 56 which had been most recently registered to the translation look-aside buffer 72. When the area-B comparator 84 outputs a coincidence signal, one stage of table retrieval is preformed. Namely, the page table 68 is retrieved on the basis of the virtual page number 58 by using as a base address the page table information preserved in the page table register 88, without accessing the area-A table 64 and the area-B table 66 in the main memory, and a page frame address obtained by the retrieval of the page table 68 is combined with the displacement 60 of the given virtual address 50, so that a complete real address is obtained. In addition, the virtual section number 52, the virtual area-A number 54, the virtual area-B number 56 and the virtual page number 58 of the given virtual address 50 and the more significant portion of the obtained real address (page frame address) are newly registered in the translation look-aside buffer 72.

If an entry is completely coincident with the virtual section number 52, the virtual area-A number 54, the virtual area-B number 56 and the virtual page number 58 of the given virtual address 50 does not exist in the translation look-aside buffer 72, and the area-B comparator 84 outputs an anticoincidence signal, the area-A comparator 76 compares the virtual section number 52 and the virtual area-A number 54 of the given virtual address 50 with a content of the area preservation register-A 74 which stores the virtual section number 52 and the virtual area-A number 54 which has been most recently registered to the translation look-aside buffer 72. When the area-A comparator 76 outputs a coincidence signal, two stages of table retrieval are preformed. Namely, the area-B table 66 is retrieved on the basis of the virtual area-B number 56 by using as a base address the area-B table information preserved in the area-B table register 78, without accessing the area-A table 64 in the main memory, and the page table 68 is retrieved on the basis of the virtual page number 58 by using as a base address the page table information outputted from the area-B table 66. Then, a page frame address obtained by the retrieval of the page table 68 is combined with the displacement 60 of the given virtual address 50, so that a complete real address is obtained. In addition, the virtual section number 52, the virtual area-A number 54 and the virtual area-B number 56 of the given virtual address 50 are registered in the area preservation register-B 82, and the retrieved entry of the area-B table 66 is registered in the page table register 68. Furthermore, the virtual section number 52, the virtual area-A number 54, the virtual area-B number 56 and the virtual page number 58 of the given virtual address 50 and the more significant portion of the obtained real address (page frame address) are newly registered in the translation look-aside buffer 72.

If the entry is completely coincident with the virtual section number 52, the virtual area-A number 54, the virtual area-B number 56 and the virtual page number 58 of the given virtual address 50 does not exist in the translation look-aside buffer 30, and each of the comparators 84 and 76 outputs an anticoincidence signal, the three stages of table retrieval are performed. First, one area table register 62 is selected in accordance with the virtual section number 52 of the given virtual address 50, and then, one area-A table 64 is selected on the output of the selected area table register 62 and retrieved in accordance with the virtual area-A number 54 of the given virtual address 50. Thereafter, one area-B table 66 is selected on the output of the selected area-A table 64 and retrieved in accordance with the virtual area-B number 56 of the given virtual address 50, and one page table 68 is selected on the output of the selected area-B table 66 and retrieved in accordance with the virtual page number 58 of the given virtual address 50. Finally, an output of the page table 68 is combined with the displacement of the given virtual address 60 so as to generate a complete real address. At this time, the virtual section number 52 and the virtual area-A number 54 of the given virtual address 50 are registered in the area preservation register-A 74, and the retrieved entry of the area-A table 66 is registered in the area-A table register 78. In addition, the virtual section number 52, the virtual area-A number 54 and the virtual area-B number 56 of the given virtual address 50 are registered in the area preservation register-B 82, and the retrieved entry of the area-B table 66 is registered in the page table register 68. Furthermore, the virtual section number 52, the virtual area-A number 54, the virtual area-B number 56 and the virtual page number 58 of the given virtual address 50 and the more significant portion of the obtained real address (page frame address) are newly registered in the translation look-aside buffer 72.

The invention has thus been shown and described with reference to the specific embodiments. However, it should be noted that the present invention is in no way limited to the details of the illustrated structures but changes and modifications may be made within the scope of the appended claims.

I claim:

1. An address translation system for converting a virtual address including a virtual section number, a virtual area number and a virtual page number into a real address, said address translation system comprising:
    a plurality of stages of tables, each including at least one area table and at least one page table;
    a translation look-aside buffer having a plurality of entries each storing a virtual section number, a virtual area number and a virtual page number;
    an area preservation register for preserving a virtual section number and a virtual area number of a given virtual address when a new entry is registered into the translation look-aside buffer;
    a table register for preserving an output of an area table selected when said new entry is registered into said translation look-aside buffer; and
    an area comparator for comparing a content of said area preservation register with a virtual section number and a virtual area number of a given virtual address,
    wherein, when the translation look-aside buffer is retrieved on the basis of the given virtual address, and an entry having the same virtual section number, virtual area number and virtual page number as those of the given virtual address is not found, the area comparator is used for comparing the content of the area preservation register with the virtual selection number and the virtual area number of the given virtual address, and if coincidence is detected by the comparator, an address translation is performed by accessing a page table on the basis of the page table information preserved in the page table register, without accessing the area table.

2. An address translation system claimed in claim 1, wherein:
    said virtual address includes said virtual section number, said virtual area number, said virtual page number a displacement indicative of an offset within a page; and
    said plurality of stages of tables are composed of;
        a group of area table registers, one of which is selected in accordance with said virtual section number, resulting in a selected area table register,
        said area tables, one of which is selected by an output of the selected area table register, resulting in a selected area table and retrieved in accordance with said virtual area number, and
        said page tables, one of which is selected by an output of said selected area table and retrieved in accordance with said virtual page number, resulting in a selected page table, wherein the real address is obtained from an output of said selected page table and said displacement of the given virtual address.

3. An address translation system claimed in claim 2, wherein:
    said virtual area number is composed of a first area number and a second area number;
    said area table includes a first area table and a second area table;
    said area preservation register includes a first area preservation register for preserving a virtual section number and a first virtual area number of a given virtual address when a new entry is registered into the translation look-aside buffer, and a second area preservation register for preserving a virtual section number, a first virtual area number and a second virtual area number of a given virtual address when a new entry is registered into the translation look-aside buffer;
    said table register includes a second area table register for preserving an output of a first area table selected when the new entry is registered into the translation look-aside buffer, and a page table register for preserving an output of a second area table selected when the new entry is registered into the translation look-aside buffer;
    said area comparator includes a first area comparator for comparing a content of the first area preservation register with a virtual section number and a first virtual area number of a given virtual address, and a second area comparator for comparing a content of the second area preservation register with a virtual section number, a first virtual area number and a second virtual area number of a given virtual address; and
    when an entry having the same virtual section number, first virtual area number, second virtual area number and virtual page number as those of the given virtual address is not found in the translation look-aside buffer, if the second area comparator outputs a coincidence signal, an address translation is performed by accessing a page table on the basis of the page table information preserved in the page table register, and if the second area comparator does not output the coincidence signal, but the first area comparator does output a coincidence signal, an address translation is performed by accessing a second area table on the basis of the second area table register, and by accessing a page table on the basis of the page table information output from the second area table.

* * * * *